United States Patent [19]

Foa' et al.

[11] Patent Number: 4,952,661

[45] Date of Patent: Aug. 28, 1990

[54] THERMOTROPIC LIQUID CRYSTALLINE POLYESTER FROM 2,5-DIHYDROXYBENZOPHENONE

[75] Inventors: Marco Foa'; Francesco Casagrande; Alfredo Coassolo, all of Novara; L. Lawrence Chapoy, Lesa, all of Italy

[73] Assignee: Montedison S.p.A., Milan, Italy

[21] Appl. No.: 449,381

[22] Filed: Dec. 6, 1989

Related U.S. Application Data

[63] Continuation of Ser. No. 221,746, Jul. 20, 1988, abandoned.

[30] Foreign Application Priority Data

Jul. 22, 1987 [IT] Italy ......................................... 21389

[51] Int. Cl.$^5$ ................................................ C08G 8/02
[52] U.S. Cl. .................................... 528/125; 528/176; 528/193

[58] Field of Search ......................... 528/125, 176, 193

[56] References Cited

U.S. PATENT DOCUMENTS

| | | | |
|---|---|---|---|
| 4,474,938 | 10/1984 | Richardson | 528/125 |
| 4,600,764 | 7/1986 | Dicke et al. | 528/125 |
| 4,667,011 | 5/1987 | Eckhardt et al. | 528/125 |

*Primary Examiner*—Harold D. Anderson
*Assistant Examiner*—T. Mosley
*Attorney, Agent, or Firm*—Stevens, Davis, Miller & Mosher

[57] ABSTRACT

Thermotropic liquid crystalline polyesters which can be processed in the molten state containing moieties derived from a dicarboxylic aromatic acid and 2,5-dihydroxybenzophenone eventually in a mixture with a substituted hydroquinones.

10 Claims, No Drawings

THERMOTROPIC LIQUID CRYSTALLINE POLYESTER FROM 2,5-DIHYDROXYBENZOPHENONE

This application is a continuation of application Ser. No. 221,746 filed July 20, 1988 now abandoned.

FIELD OF THE INVENTION

This invention relates to thermotropic liquid crystalline polyesters. More particularly, this invention relates to thermotropic liquid crystalline polyesters which can be processed easily and have the mesogenic group in its main chain.

BACKGROUND OF THE INVENTION

Thermotropic polyesters which demonstrate optical anistropy in the melted state are known. These products have been described in the literature on many occasions, for example: "Liquid Crystal Polymer", British Polymer Journal, p. 154 (December 1980); "Liquid Crystalline Aromatic Polyesters", Journal of Macromolecular Science Chemistry, p. 170 (1984); "Rigid Chain Polymers", Die Augewandte Makromolekulare Chemie, 109–120, p. 1 (1982); "Thermotropic Liquid Crystalline Polymers", Die Augenwandte Makromolekulare Chemie, 145/146, p. 231 (1986); "Liquid Cristalline Polymers: A Novel State of Material", Journal of Molecular Science Review, C26 (4) p. 551 (1986).

From these polymers, it is possible to obtain high toughness fusion fibers or molded products, for example by injection molding. The products have suitable characteristics of rigidity, hardness and toughness.

The polymers with the properties referred to above must also be easy to process, highly resistant to heat and oxidation. Finally, these polymers have a high HDT (Heat Distortion Temperature) and resistance to attack by solvents due to their crystallinity.

Polymers which can be obtained by polycondensation of terephthalic acid and hydroquinone (poly 1-4-phenylenterephtalate) melt at temperatures which are too high (more than 600° C.) for them to be processed without decomposition of the polymer itself. One way used to lower the melting point is to use substitutes in the aromatic ring of the hydroquinone or the terephthalic acid or to modify the polymer by adding other rigid comonomers.

U.S. Pat. No. 4,159,365 describes formation of a polymer obtained by condensation of terephthalic acid and phenyl hydroquinone containing up to 10% of another aromatic or cycloaliphatic group capable of forming polyesters. However, of these groups, other substituted hydroquinones are not specifically mentioned.

U.S. Pat. No. 4,360,658 describes formation of co-polyesters by condensation of terephthalic acid, phenyl hydroquinone and quantities of hydroquinone with a mole content of 25 to 50% of the total quantity of diols.

U.S. Pat. No. 4,238,600 describes preparation of polymers obtained from terephthalic acid, phenyl hydroquinone and quantities of t-butyl-hydroquinone with a mole content of 25 to 65% of the quantity of diols.

The polymers described in the latter patent however have a melting point of more than 340° C., increasing with the level of the contents of the t-butyl-hydroquinone in the starting mixture.

U.S. Pat. No. 4,447,593 describes preparation of polymers of terephtalic acid with hydroquinones substituted by alkyl groups containing at least 5 atoms of carbon or by aralkyl groups containing at least 7 atoms of carbon, in addition to other hydroquinones substituted up to a maximum percentage of 20%.

Finally, U.S. Pat. No. 4,600,765 reports formation of polyesters by polycondensation of therphthalic acid, phenyl hydroquinane and (1-phenylethyl) hydroquinone obtaining liquid crystalline polymers having a melting point around 320° C.

All the preceding references are hereby incorporated by reference.

SUMMARY OF THE INVENTION

It has been discovered by the applicant that easily processable thermotropic liquid crystalline polymers, which have good crystallinity, are those containing a repetitive moiety derived from 2,5-dihydroxybenzophenone.

DETAILED DESCRIPTION OF THE INVENTION

Thus, the subject of this invention is thermotropic liquid crystalline polyesters comprising:

(a) at least one moiety derived from a dicarboxylic aromatic acid;

(b) one moiety derived from 2,5-dihydroxybenzophenones; and (c) eventually at least one moiety derived from substituted hydroquinones of the general formula:

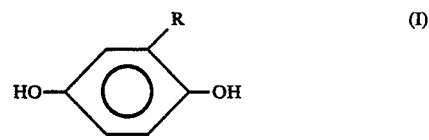

(I)

in which R represents an atom of halogen or an alkyl, aryl or aralkyl radical containing from 1 to 18 carbon atoms.

According to one of the preferred embodiments of the polyesters of this invention at least 90 mole percent of the dicarboxylic aromatic acid is present in the para isomeric form.

Examples of dicarboxylic aromatic acids are terephthalic acid, eventually substituted with at least one halogen atom such as chloro or bromo, methylterephthalic acid, 1,4-naphthalenedicarboxylic acid, 1,5-naphthalenedicarboxylic acid, 2,6-naphthalenedicarboxylic acid, and 4,4-diphenyldicarboxylic acid etc.

Examples of substituted hydroquinones are chlorohydroquinone, bromohydroquinone, methylhydroquinone, ethylhydroquinone, propylhydroquinone, t-butylhydroquinone, 2 phenylhydroquinone, 2-phenethyl hydroquinone, 2-(1-methyl-1-phenylethyl)-hydroquinone 2-(4-methylbenzyl)-hydroquinone, (1-naphthylmethyl)-hydroquinone, (2-naphthylmethyl) hydroquinone, (triphenylmethyl) hydroquinone etc.

The moieties derived from the dicarboxylic aromatic acid are in a stoichiometric ratio with the diols of moieties (b) and (c) while the latter are used with a c/b molar ratio of from 0 to 2.4, preferably of from 0.1 to 2.4.

The thermotropic polyesters which are particularly preferred are those containing the following repetitive moieties:

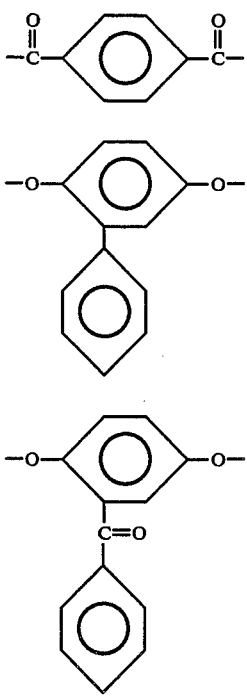

in which the molar ratio II/(III+IV) is 1, while the molar ratio III/IV varies between 0 and 2.4, preferably between 0.1 and 2.4.

The polymers of this invention are optically anisotropic in the melted state, as can be seen when analyzed under an optical microscope with polarized light. The melting point is between 240° and 370° C. and the inherent viscosity is between 0.3 and 4, measured in a 1:1 mixture of trifluoracetic acid and methylene chloride at 30° C. at a concentration of 2.5 g/liter.

The molecular weight and the crystallinity can be increased by heating the polymer particles in an inert environment or under vacuum at a temperature just under the melting point for a time varying between 1 and 20 hours. For example, after heating for 2 hours, a crystallinity of about 20% in volume is obtained.

The polymers of this invention can be used to obtain shaped articles which can be prepared with normal thermoplastic polymer processing technologies such as, for example, injection and extrusion molding. They can be processed in the form of film or fiber. They can be used as matrices for fiber or inorganic filler based composites and can be used in the preparation of mixtures with other polymers.

The preparation of liquid crystalline polyesters of this invention can be carried out using conventional techniques, allowing the above-mentioned precursors of the moieties to react, under normal conditions for preparation of polyester resins.

The preferred precursors for moieties (a) are the acids or corresponding dihalides such as the chlorides or bromides. The preferred precursors for moieties (c) are the diols which are commercially available or the corresponding acetates and propionates which can be obtained by normal techniques of esterification. 2,5-dihydroxybenzophenone is a known product which can be obtained from hydroquinone dibenzoate by means of Fries's rearrangement, as described in the "Proceedings of Indian Academic Science", 29A, 269–273 (1949), or by producing a reaction of hydroquinone with benzoic acid in the presence of boron fluoride at 160° C., as described in Archiv der Pharmazie, 288, 102–113 (1955), both hereby incorporated by reference.

The liquid crystalline polyesters of this invention can be obtained in the melted state or in the presence of a dispersion medium with a high boiling point such as diphenyl sulphone or mixtures of partially hydrogenated terphenyls, by transesterification between dicarboxylic aromatic acids and the acetates or propionates of diols at a temperature of between 250° and 350° C. to encourage the complete evolution of the acids also operating under vacuum.

The reaction can optionally be conducted in the presence of a transesterification catalyst such as, for example, phosphates of alkali metals or of alkaline earth metals.

Other catalysts could be those commonly used in polycondensation processes and illustrated in the "Enclopaedia of Polymer Science and Technology", vol 10, pp. 722–723 (1969), hereby incorporated by reference.

Examples of these catalysts are the oxides, hydroxides, hydrides, halides, alcoholates or phenolates, salts and complex salts of organic or inorganic acids of lithium, sodium, potassium, magnesium, calcium, titanium, manganese, cobalt, zinc, tin, antimony, lanthanium, cerium, lead and germanium.

The quantity of catalyst required is between 0.005 and 1 molar percent, preferably between 0.01 and 0.2 molar percent calculated on the total quantity of the reagents.

According to an alternative method, the liquid crystalline polyesters of this invention can be obtained in solution by polycondensation of the halides of the dicarboxylic aromatic acids and the mixture of the diolefins in a suitable solvent. The reaction temperature is between 25° and 220° C. The reaction is carried out in the presence of a base and/or flow of nitrogen to encourage the elimination of the halogenated acid.

The preferred base is pyridine while the solvents which are particularly preferred include both aliphatic and aromatic chlorides such as methyl chloride, chlorobenzene, dichloro benzene and trichlorobenzene.

The polymer obtained in this way is then recovered by evaporation of the solvent or by precipitation with a non-solvent and subsequent filtration.

EXAMPLES

Some illustrative but non-limiting examples are given below to provide a further description of this invention and to provide some practical examples.

EXAMPLE 1

6.9 g (34 mM) of terephthalic acid dichloride, 3.16 g (17 mM) of 2-phenylhydroquinone, 3.64 g (17 mM) of 2.5 dihydroxybenzophenone and 150 cc of 1,2,4-trichlorobenzene are placed in a 250 cc glass flask. It has 4 necks and is provided with a mechanical agitator, a refrigerant and an inlet tube for nitrogen.

The mixture is kept agitated and under a flow of nitrogen, for 30 minutes at room temperature. Then it is heated and brought up to a temperature of 220° C. in a silicon oil bath.

This temperature is maintained for 12 hours until the production of HCl has almost ceased. When polymerization is terminated, the solution appears in the form of a light-colored slightly gelatinous mass.

While maintaining the flow of nitrogen and agitation, the oil bath is removed and the flask is permitted to cool. When the reaction mixture is at 50° C., the gelatinous mass is poured into acetone; and the precipitate is filtered.

The polymer product is washed with acetone (twice), hot water (twice) and acetone/methanol (twice).

The end product is vacuum dried for 3 hours at 170°–180° C.

The dried polymer has a melting temperature (Tm) of about 312° C. and an inherent viscosity of 2.80 (measured at a temperature of 30° C. in a solvent composed of equal parts of trifluoroacetic acid and methylene chloride at a concentration of 2.5 g/liter).

The melted polymer is optically anisotropic under a polarized light microscope.

EXAMPLE 2–10

Other polyesters are prepared according to the method described in example 1.

The quantities of reagents are listed in the table below.

| Example | (a) (mol) | (b) (mol) | (c) (mol) | (d) (mol) | (e) (mol) | (f) (mol) | (g) (mol) | Inherent Viscosity (dl/g) | Melting Temp. (Tm °C.) |
|---|---|---|---|---|---|---|---|---|---|
| 2 | 1 | 0.40 | 0.60 | | | | | 1.90 | 318 |
| 3 | 1 | 0.60 | 0.40 | | | | | 1.53 | 310 |
| 4 | 1 | 0.50 | | 0.50 | | | | 1.48 | 269 |
| 5 | 1 | 0.60 | | 0.40 | | | | 1.48 | 262 |
| 6 | 1 | 0.40 | | 0.60 | | | | 1.48 | 269 |
| 7 | 1 | 0.50 | | | 0.50 | | | 2.15 | 314 |
| 8 | 1 | 1 | | | | | | 1.45 | 358 |
| 9 | | 0.50 | 0.50 | | | 1 | | 2.00(1) | 368 |
| 10 | 1 | 0.50 | | | | | 0.50 | 2.00 | 252 |

(1) Viscosity measured at a temperature of 60° C. in pentafluorophenol at the concentration of 2.5 g/l
(a) = terephthalic acid chloride
(b) = 2,5-dihydroxybenzophenone;
(c) = 2-phenylhydroquinone;
(d) = 2-(1-methyl-1-phenylethyl)hydroquinone;
(e) = (1-phenylethyl)hydroquinone;
(f) = 2,6-naphthalenedicarboxlic acid chloride;
(g) = methylhydroquinone All polyesters are optically anisotropic in the melted state.

The melting temperature is defined by Differential Scanning Calorimetry with a scansion of 20° C./minute.

The product of example 3 is heated at 300° C. for 2 hours under a flow of nitrogen. Crystallinity increased in volume from 16 to 18% while the inherent viscosity went up to 3.20.

EXAMPLE 11

8 g (48 mM) of terephthalic acid, 4.46 g (24 mM) of 2-phenylhydroquinone, 5.13 g (24 mM) of 2,5-dihydroxybenzophenone, 0.38 g of trisodium phosphate dodecahydrate, 12 g of acetic anhydride and 28 g of diphenyl sulphone are placed in a 100 cc glass flask with 4 necks under a light flow of nitrogen. It has a mechanical agitator, an inlet tube for nitrogen, a thermometer and a distilling head.

Maintaining the light flow of nitrogen and under agitation, the reaction mixture is brought up to 140° C. in a high temperature silicon oil bath.

This temperature is maintained for 1 hour. Then, distillation of acetic acid is started. The temperature is then brought up to 240° C. and kept there for a further hour.

During this stage, the reaction mixture has a slightly yellowish color. The solution is slightly turbid.

The oil bath is then brought up to a temperature of 280° C. for one hour; and then, increased to 320° C. for another hour.

At the end, the flask contains a yellow solution which is not limpid and is easily agitable. The mixture is cooled at room temperature, always under a light flow of nitrogen. The solid mass obtained in this way is finely ground.

The powder which results is washed twice with acetone, twice with hot water and twice with acetone/methanol. After each washing, filtration is sufficiently fast.

The final product is vacuum dried for two hours at 160°–170° C.

The polymer obtained in this way has a melting temperature (Tm) of about 303° C. and an inherent viscosity of 0.76.

The melted polymer is optically anisotropic under a polarized light microscope.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. Thermotropic liquid crystalline polyester optically anisotropic in the melted state comprising:
   (a) at least one moiety derived from a dicarboxylic aromatic acid;
   (b) one moiety derived from 2,5-dihydroxybenzophenone; and
   (c) optionally at least one moiety derived from substituted hydroquinones of the general formula:

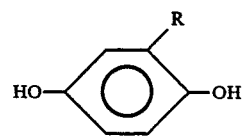

(I)

in which R represents an atom of halogen or an alkyl, aryl, or aralkyl radical containing from 1 to 18 carbon atoms.

2. A polyester according to claim 1, wherein at least 90 mole percent of the dicarboxylic aromatic acid moiety is present in the para isomeric from.

3. A polyester according to claim 1, wherein the dicarboxylic aromatic acid is terephthalic acid, optionally substituted by at least one halogen atom, methylterephthalic acid, 1,4-naphthalene dicarboxylic acid, 1,5-naphthalene dicarboxylic acid, 2,6-naphthalene dicarboxylic acid or 4,4-diphenyldicarboxylic acid.

4. A polyester according to claim 1, wherein the substituted hydroquinone when present is a chlorine or bromine substituted hydroquinone, methyl hydroquinone, ethylhydroquinone, propylhydroquinone, t-butylhydroquinone, 2-phenylhydroquinone, 2-phenethyl hydroquinone, 2-(1-methyl-1-phenethyl) hydroquinone, 2-(4-methylbenzyl) hydroquinone, (1-naphthyl-methyl) hydroquinone, (2-naphthylmethyl) hydroquinone, or (triphenylmethyl) hydroquinone.

5. A polyester according to claim 1, wherein the moieties derived from the dicarboxylic aromatic acid are in stoichiometric ratio with the diols of moieties (b) and (c) while the latter are used with a c/b molar ratio of from 0 to 2.4.

6. A polyester according to claim 5, wherein the c/b molar ratio is from 0.1 to 2.4.

7. A polyester according to claim 1, wherein the polyester contains the following repetitive moieties:

 (II)

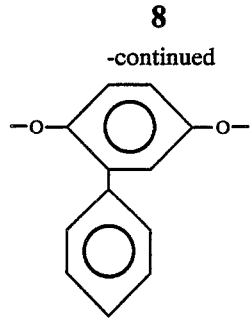 (III)

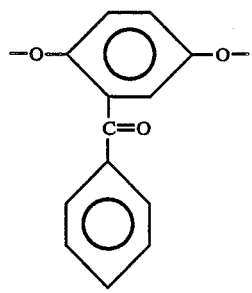 (IV)

in which the molar ratio II/III+IV) is 1, while the molar ratio II/IV varies from 0 to 2.4.

8. A polyester according to claim 1, wherein the molar ratio III/IV varies from 0.1 to 2.4.

9. Polyesters according to claim 1, wherein the polyester has a melting point of between 240° and 330° C. and an inherent viscosity of between 0.3 and 4 measured in a 1:1 mixture of acetic acid trifluoride and methylene chloride at 30° C. and a concentration of 2.5 g/l.

10. A fiber, film, injection- or extrusion-molded product, or matrix for fiber- or filler-based composites, when made of a polyester according to claim 1.

* * * * *